(12) United States Patent
Banavalikar et al.

(10) Patent No.: US 9,143,582 B2
(45) Date of Patent: Sep. 22, 2015

(54) INTEROPERABILITY FOR DISTRIBUTED OVERLAY VIRTUAL ENVIRONMENTS

(71) Applicant: International Business Machines Corporation, Armonk, NY (US)

(72) Inventors: Bhalachandra G. Banavalikar, Cupertino, CA (US); Amitabha Biswas, San Francisco, CA (US); Vinit Jain, Austin, TX (US); Jayakrishna Kidambi, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 13/791,719

(22) Filed: Mar. 8, 2013

(65) Prior Publication Data

US 2014/0254603 A1   Sep. 11, 2014

(51) Int. Cl.
*H04L 12/28* (2006.01)
*H04L 29/06* (2006.01)

(52) U.S. Cl.
CPC ............... *H04L 69/03* (2013.01); *H04L 12/28* (2013.01); *H04L 29/06* (2013.01)

(58) Field of Classification Search
CPC .......... H04L 29/06; H04L 69/03; H04L 12/28
USPC ....................................................... 370/401
See application file for complete search history.

(56) References Cited

U.S. PATENT DOCUMENTS

| | | | |
|---|---|---|---|
| 6,426,944 B1 | 7/2002 | Moore | |
| 7,188,364 B2 | 3/2007 | Volpano | |
| 7,424,019 B1 | 9/2008 | Kopelman et al. | |
| 7,478,173 B1 | 1/2009 | Delco | |
| 7,885,276 B1 | 2/2011 | Lin | |

(Continued)

FOREIGN PATENT DOCUMENTS

| | | |
|---|---|---|
| CN | 102835080 A | 12/2012 |
| CN | 102857416 A | 1/2013 |

(Continued)

OTHER PUBLICATIONS

Patel, B.V. et al., "An Architecture and Implementation Toward Multiprotocol Mobility", IEEE Personal Communications, Jun. 1995, pp. 32-42, vol. 2, No. 3, IEEE, USA.

(Continued)

*Primary Examiner* — Sai-Ming Chan
(74) *Attorney, Agent, or Firm* — Sherman IP LLP; Kenneth L. Sherman; Steven Laut

(57) ABSTRACT

Embodiments of the invention relate to providing interoperability between hosts supporting multiple encapsulation. One embodiment includes a method that includes mapping packet encapsulation protocol type information for virtual switches. Each virtual switch is associated with one or more virtual machines (VMs). It is determined whether one or more common encapsulation protocol types exist for a first VM associated with a first virtual switch and a second VM associated with a second virtual switch based on the mapping. A common encapsulation protocol type is selected if it is determined that one or more common encapsulation protocol types exist for the first virtual switch and the second virtual switch. A packet is encapsulated for communication between the first VM and the second VM using the selected common encapsulation protocol type.

20 Claims, 9 Drawing Sheets

(56) References Cited

U.S. PATENT DOCUMENTS

| | | | |
|---|---|---|---|
| 8,665,706 | B2 | 3/2014 | Tan |
| 8,718,061 | B2 | 5/2014 | Chiueh et al. |
| 8,804,529 | B2 | 8/2014 | Bergamasco et al. |
| 8,892,706 | B1 | 11/2014 | Dalal |
| 2009/0141729 | A1 | 6/2009 | Fan |
| 2009/0268614 | A1 | 10/2009 | Tay et al. |
| 2009/0319634 | A1* | 12/2009 | Tanaka et al. ............ 709/212 |
| 2011/0051723 | A1 | 3/2011 | Rabie et al. |
| 2011/0141891 | A1 | 6/2011 | So |
| 2011/0283017 | A1 | 11/2011 | Alkhatib et al. |
| 2011/0299532 | A1 | 12/2011 | Yu et al. |
| 2011/0299537 | A1 | 12/2011 | Saraiya et al. |
| 2012/0063316 | A1 | 3/2012 | Ghanwani et al. |
| 2012/0093034 | A1 | 4/2012 | Kamath et al. |
| 2012/0173757 | A1 | 7/2012 | Sanden |
| 2012/0250682 | A1 | 10/2012 | Vincent et al. |
| 2012/0275328 | A1 | 11/2012 | Iwata et al. |
| 2012/0290703 | A1 | 11/2012 | Barabash et al. |
| 2014/0086253 | A1* | 3/2014 | Yong .................. 370/395.53 |
| 2014/0269321 | A1 | 9/2014 | Kabmle et al. |
| 2014/0269709 | A1 | 9/2014 | Benny et al. |
| 2014/0269712 | A1 | 9/2014 | Kidambi |

FOREIGN PATENT DOCUMENTS

| | | |
|---|---|---|
| CN | 102946354 A | 2/2013 |
| KR | 100865722 B1 | 10/2008 |

OTHER PUBLICATIONS

Mao, Y. et al., "MOSAIC: Multiple Overlay Selection and Intelligent Composition", University of Pennsyivania CIS Technical Report, 2007, pp. 1-14, University of Pennsylvania, USA.

Mao, Y. et al., "MOSAIC: Unified Platform for Dynamic Overlay Selection and Composition", University of Pennsyivania CIS Technical Report, pp. 1-14, University of Pennsylvania, USA.

Andersen, D.G., "Improving End-to-End Availability Using Overlay Networks", Doctoral Thesis in Computer Science and Engineering, Feb. 2005, pp. 1-150, Massachusetts Institute of Technology, USA.

Mell, P. et al., "The NIST Definition of Cloud Computing", Special Publication, Version 15, Oct. 7, 2009, 2 pages, National Institute of Standards and Technology, Information Technology Laboratory, USA.

International Search Report and Written Opinion dated Jun. 30, 2014 for International Application No. PCT/CN2014/073012 from State Intellectual Property Office of the P.R. China, pp. 1-10, Beijing, China.

Edwards, A. et al., "Diverter: A New Approach to Networking Within Virtualized Infrastructures", Proceedings of the First ACM Workshop on Research on Enterprise Networking (WREN '09), Aug. 2009, pp. 103-110, ACM, USA.

Birman, K.P., "Technology Challenges for Virtual Overlay Networks", IEEE Transactions on Systems, Man and Cybernetics, Part A: Systems and Humans, Jul. 2001, pp. 319-327, vol. 31, No. 4, IEEE, USA.

Recio, R., "Distributed Overlay Virtual Ethernet (DOVE) Networks", PowerPoint Presentation, 2012, Slides 1-27, IBM Corporation, USA.

International Search Report and Written Opinion dated Jun. 17, 2014 for International Application No. PCT/CN2014/073118 from State Intellectual Property Office of the P.R.China (ISA/CN), pp. 1-11, Beijing, China.

Iwata, A. et al., "Global Open Ethernet Architecture for a Cost-Effective Scalable VPN Solution", IEICE Transactions Communication, Jan. 2004, pp. 142-151, vol. E87-B, No. 1, Institute of Electronics, Information, and Communication, Japan.

Anonymous, "Intelligent MCs Debunk Perceptions", Communications News, Oct. 2004, pp. 2, 42, & 44, vol. 41, No. 10, Nelson Publishing, Inc., USA.

Cisco Corporation, "Routing Between VLANs Overview", Cisco IOS Switching Services Configuration Guide, 2010, pp. XC-302-XC-312, Cisco Corporation, USA.

U.S. Non-Final Office Action for U.S. Appl. No. 13/831,215 mailed Aug. 25, 2014.

Anonymous, " IEEE Standards for Local and metropolitan area networks—Virtual Bridged Local Area Networks" IEEE Std 802.1Q, 2003 Edition, pp. 1-152, United States.

U.S. Non-Final Office Action for U.S. Appl. No. 13/840,492 mailed Jan. 5, 2015.

U.S. Non-Final Office Action for U.S. Appl. No. 13/795,666 mailed Jan. 22, 2015.

U.S. Final Office Action for U.S. Appl. No. 13/831,215 mailed Dec. 9, 2014.

U.S. Notice of Allowance for U.S. Appl. No. 13/840,492 mailed Apr. 10, 2015.

* cited by examiner

INTEROPERABILITY FOR DISTRIBUTED OVERLAY VIRTUAL ENVIRONMENTS

BACKGROUND

Embodiments of the invention relate to overlay virtual environments and, in particular, providing interoperability between hosts supporting multiple encapsulation networks.

Network virtualization that use overlays use encapsulation, such as virtual extensible local area network (VxLAN) encapsulation and network virtualization generic routing encapsulation (NVGRE), which may be supported by a hypervisor and networking vendors. To use VxLAN or NVGRE encapsulation, hypervisor virtual switches are modified to support the respective overlay technology. Incompatibility with encapsulation types makes it necessary to use a translation gateway, which translates between the different packet formats. The translation gateways are often communication bottlenecks, which may impact communication performance.

BRIEF SUMMARY

Embodiments of the invention relate to providing interoperability between hosts supporting multiple encapsulation. One embodiment includes a method that includes mapping packet encapsulation protocol type information for virtual switches. Each virtual switch is associated with one or more virtual machines (VMs). In one embodiment, it is determined whether one or more common encapsulation protocol types exist for a first VM associated with a first virtual switch and a second VM associated with a second virtual switch based on the mapping. In one embodiment, a common encapsulation protocol type is selected if it is determined that one or more common encapsulation protocol types exist for the first virtual switch and the second virtual switch. A packet is encapsulated for communication between the first VM and the second VM using the selected common encapsulation protocol type.

Another embodiment comprises a system that includes a hardware layer comprising physical devices. A plurality of virtual switches are each associated with one or more virtual machines (VMs) overlaying the hardware layer. A server including a distributed overlay virtual Ethernet (DOVE) connectivity service (DCS) maps packet encapsulation protocol type information for the plurality of virtual switches and determines whether one or more common encapsulation protocol types exist for a first VM associated with a first virtual switch and a second VM associated with a second virtual switch based on the packet encapsulation protocol map, selects a common encapsulation protocol type if one or more common encapsulation protocol types exist for the first virtual switch and the second virtual switch. The first virtual switch encapsulates a packet for communication between the first VM and the second VM using the selected common encapsulation protocol type.

Another embodiment comprises a computer program product for providing interoperability between hosts supporting multiple encapsulation. The computer program product comprises a computer-readable storage medium having program code embodied therewith, the program code readable/executable by a processor to perform a method comprising: mapping, by the processor, packet encapsulation protocol type information for a plurality of virtual switches. In one embodiment, each virtual switch is associated with one or more virtual machines (VMs). In one embodiment, it is determined by the processor whether one or more common encapsulation protocol types exist for a first VM associated with a first virtual switch and a second VM associated with a second virtual switch based on the mapping. A common encapsulation protocol type is selected by the processor if it is determined that one or more common encapsulation protocol types exist for the first virtual switch and the second virtual switch. A packet is encapsulated by the processor to communicate between the first VM and the second VM using the selected common encapsulation protocol type.

These and other features, aspects and advantages of the present invention will become understood with reference to the following description, appended claims, and accompanying figures.

DETAILED DESCRIPTION

Figure 1:
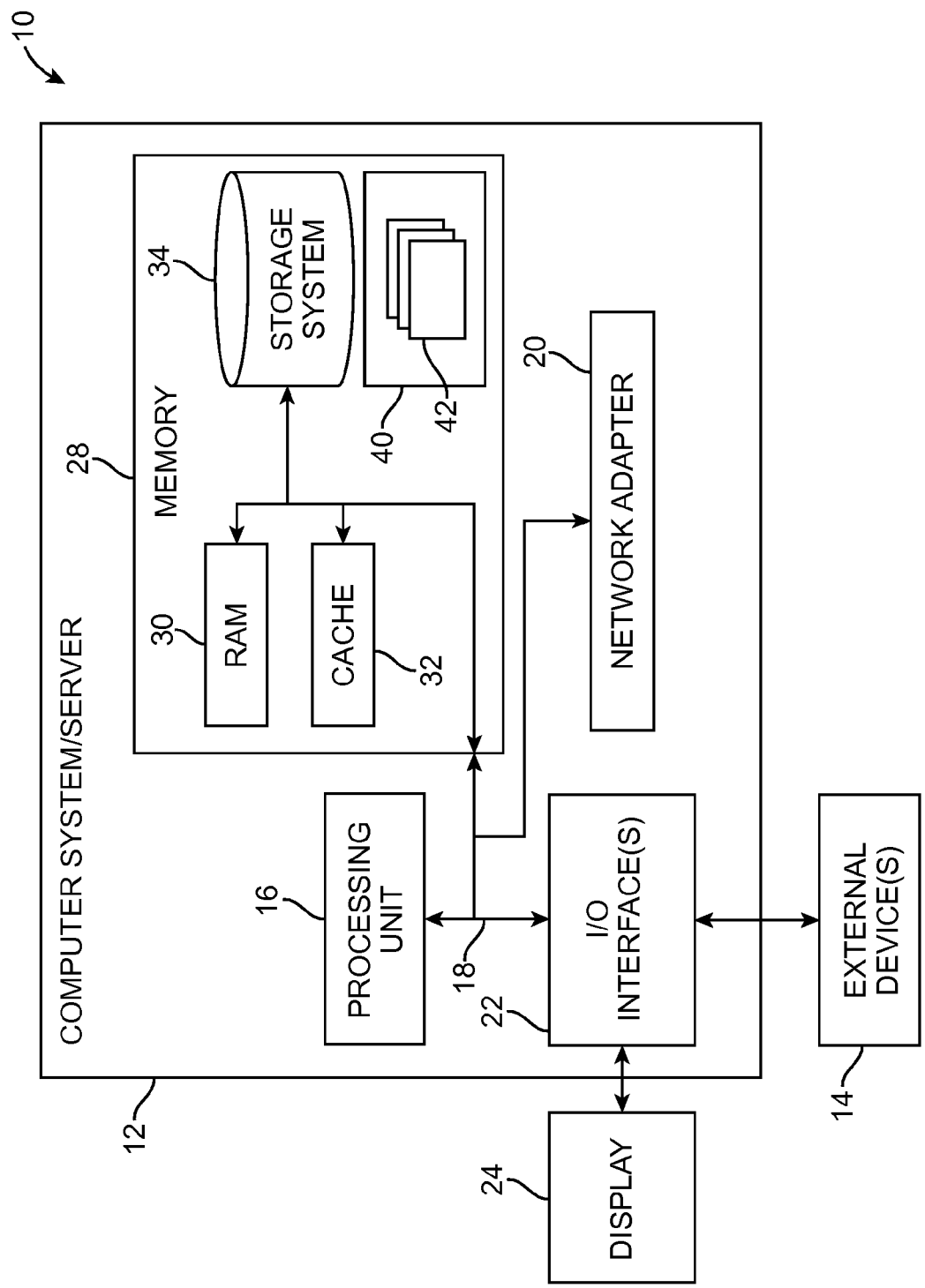
FIG. 1 depicts a cloud computing node, according to an embodiment of the present invention.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thus providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 1, computer system/server 12 in cloud computing node 10 is shown in the form of a general purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable, and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wired, optical fiber cable, radio frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

The computer system/server 12 may also communicate with one or more external devices 14, such as a keyboard, a pointing device, etc.; a display 24; one or more devices that enable a consumer to interact with the computer system/server 12; and/or any devices (e.g., network card, modem, etc.) that enable the computer system/server 12 to communicate with one or more other computing devices. Such communication can occur via I/O interfaces 22. Still yet, the computer system/server 12 can communicate with one or more networks such as a local area network (LAN), a general wide area network (WAN), and/or a public network (e.g., the Internet) via a network adapter 20. As depicted, the network adapter 20 communicates with the other components of the computer system/server 12 via a bus 18. It should be understood that although not shown, other hardware and/or software components could be used in conjunction with the computer system/server 12. Examples include, but are not limited to: microcode, device drivers, redundant processing units, external disk drive arrays, RAID systems, tape drives, and data archival storage systems, etc.

Figure 2:
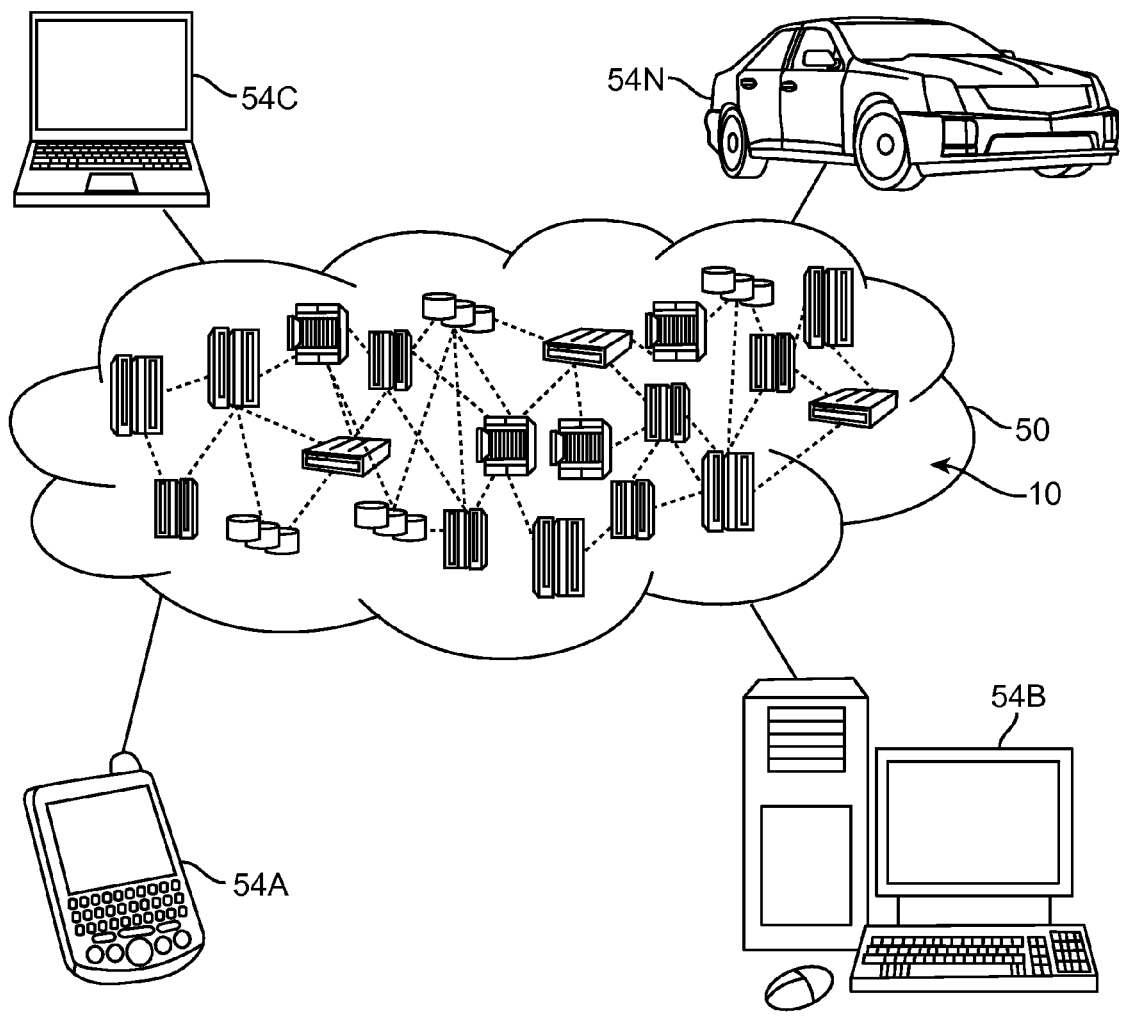
FIG. 2 depicts a cloud computing environment, according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
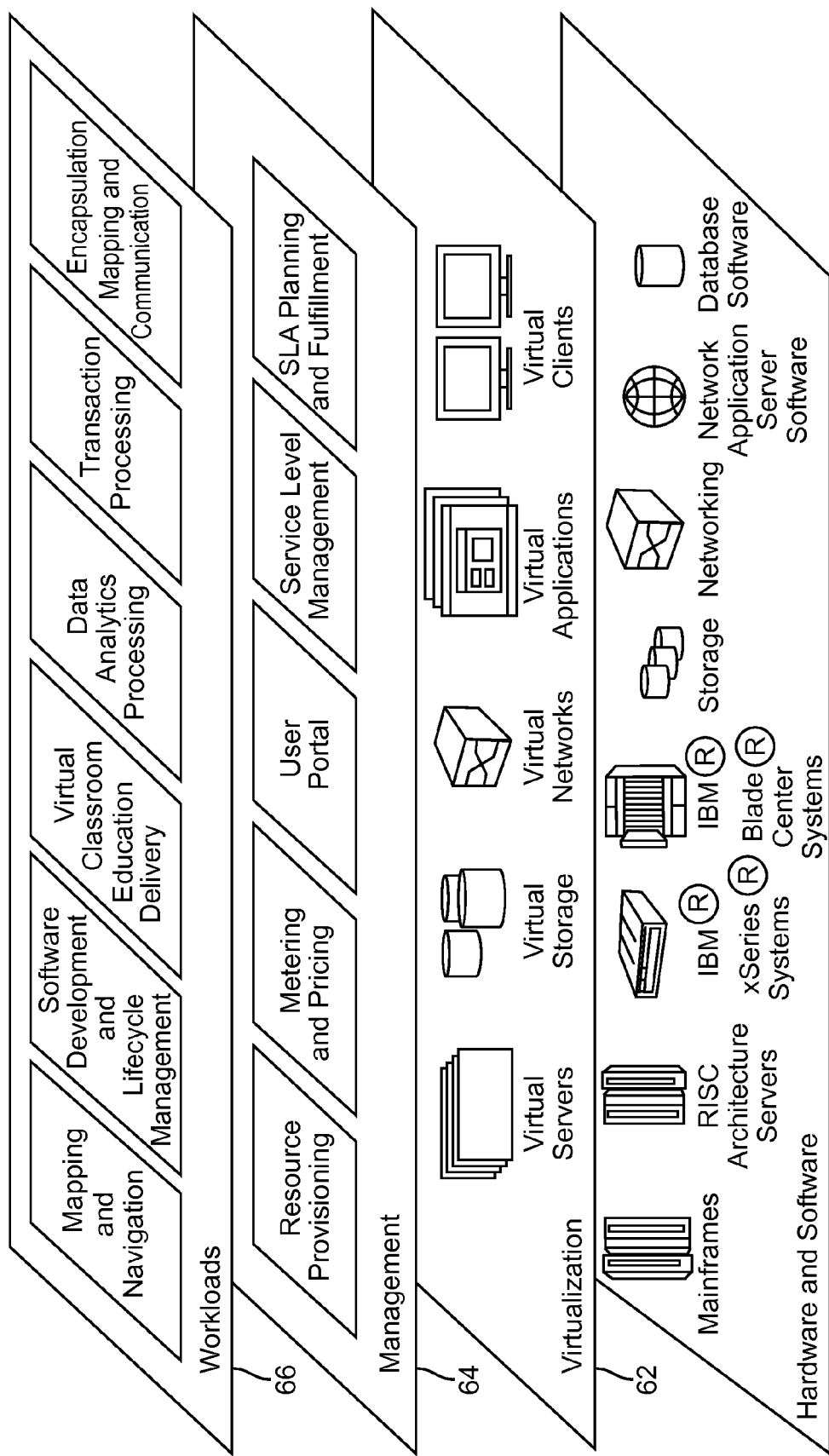
FIG. 3 depicts abstraction model layers, according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

A hardware and software layer 60 includes hardware and software components. Examples of hardware components include mainframes. In one example, hardware components comprise IBM® zSeries® systems and RISC (Reduced Instruction Set Computer) architecture-based servers. In one example, hardware components comprise IBM pSeries® systems, IBM xSeries® systems, IBM BladeCenter® systems, storage devices, networks, and networking components. Examples of software components include network application server software. In one example, software components comprise IBM WebSphere® application server software and database software. In one example, software components comprise IBM DB2® database software. (IBM, zSeries, pSeries, xSeries, BladeCenter, WebSphere, and DB2 are trademarks of International Business Machines Corporation registered in many jurisdictions worldwide.)

A virtualization layer 62 provides an abstraction layer from which the following examples of virtual entities may be provided: virtual servers; virtual storage; virtual networks, including virtual private networks; virtual applications and operating systems; and virtual clients.

In one example, a management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment and provide billing or invoicing for consumption of these resources. In one example, these resources may comprise application software licenses. Security provides identity verification for cloud consumers and tasks as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

A workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and encapsulation mapping and communication. As mentioned above, all of the foregoing examples described with respect to FIG. 3 are illustrative only, and the invention is not limited to these examples.

It is understood all functions of the present invention as described herein are typically performed by the network independent network interface system 500 (FIG. 5), which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of clustered computing environment now known or later developed.

Embodiments of the invention relate to providing interoperability between hosts supporting multiple encapsulation. One embodiment includes a method that includes mapping packet encapsulation protocol type information for virtual switches. Each virtual switch is associated with one or more virtual machines (VMs). In one embodiment, it is determined whether one or more common encapsulation protocol types exist for a first VM associated with a first virtual switch and a second VM associated with a second virtual switch based on the mapping. In one embodiment, a common encapsulation protocol type is selected if it is determined that one or more common encapsulation protocol types exist for the first virtual switch and the second virtual switch. A packet is encapsulated for communication between the first VM and the second VM using the selected common encapsulation protocol type.

Figure 4:
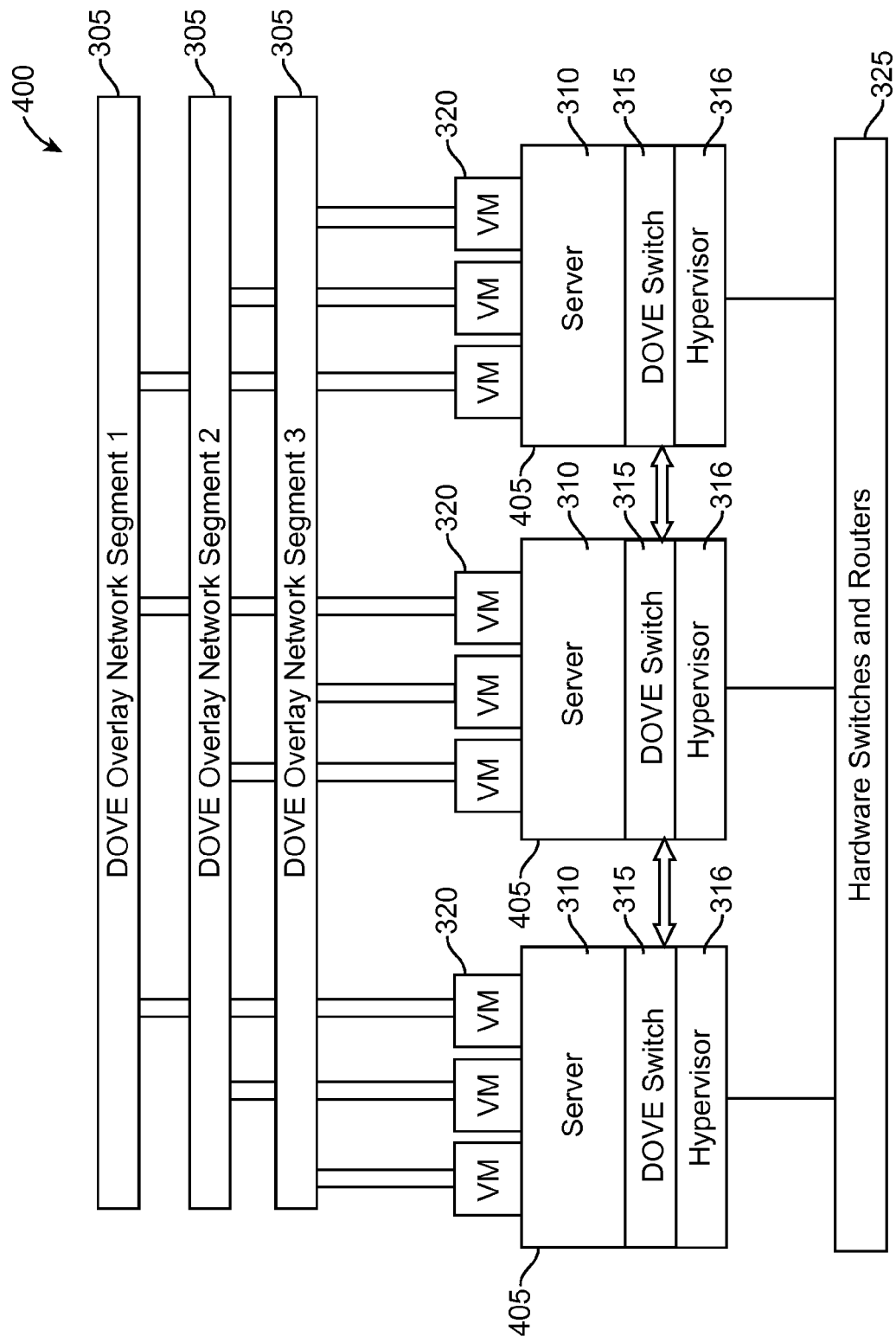
FIG. 4 is a block diagram illustrating a distributed overlay virtual environment for employing an embodiment of the present invention.

FIG. 4 shows a block diagram illustrating a distributed overlay virtual environment 400 for employing an embodiment of the present invention. In one embodiment, the distributed overlay virtual environment 400 may comprise a distributed overlay virtual Ethernet (DOVE) network system. The distributed overlay virtual environment 400 includes multiple virtual systems (or networks) 405 (also known as DOVE modules in one embodiment) each comprising a server 310 (or host) with a virtual switch 315, hypervisor 316 and VMs 320, which overlay a physical layer 325 (e.g., including physical hardware and software processes) that may include physical switches, routers, servers, gateways, firewalls, etc. The physical layer 325 may also be referred to as the under layer. In one embodiment, overlay network segments 1-N 305 (e.g., overlay network segments 1-3) connect the multiple systems for communication of the different elements (e.g., hypervisors 316, VMs 320), where N is a positive number (e.g., 2, 3, 5, 10, etc.). It should be noted that while three systems 405 are shown, more (or less) systems 405 may be included in the distributed overlay virtual environment 400. In one embodiment, the virtual switches 315 comprise DOVE switches.

In one embodiment, the overlay network segments 1-N 305 create overlay networks between the hypervisors 316 and use encapsulation of packets, where packets originating from one VM 320 are encapsulated (e.g., adding overlay and physical network headers) and the physical layer 325 (underlay) is used to deliver to a server 310 where the target VM 320 resides. In one embodiment, in the physical layer 325, an outer header is used by physical switches to forward packets, where an overlay identification (ID) in an encapsulation header provides traffic isolation. Incoming packets to a virtual switch 315 of a destination server 310 are decapsulated (e.g., the encapsulation headers are stripped from the packet) and delivered to a destination VM 320. In one embodiment, address independence between different virtual systems 405 is supported. For example, two different VMs 320 operating in two different systems 405 may have the same Internet Protocol (IP) address and media access control (MAC) address. As another example, the systems 405 support deploying VMs 320, which belong to the same system 405, to different hosts that are located in different physical subnets (includes switches and/or routers between the physical entities). In another embodiment, VMs 320 belonging to different systems 405 may be hosted on the same physical host. In yet another embodiment, the systems 405 support VM 320 migration anywhere in a data center without changing the VM 320 network address and losing its network connection.

In one embodiment, the systems 405 encapsulate data with physical path translations based upon policies (e.g., from a DCS), and send the encapsulated data between systems 405 that, in turn, is decapsulated and forwarded to a destination VM 320. In one embodiment, the policies describe in a logical manner how data is required to be sent over virtual networks without details of the underlying physical entities that performs particular tasks.

In one embodiment, the hypervisors 316 (e.g., VM 320 managers) allow multiple operating systems (e.g., VMs, such as VMs 320) to run concurrently on a host computer. A hypervisor 316 provides abstraction of physical resources to the VMs 320. For example, a physical network interface card (NIC) may be abstracted as a virtual NIC (vNIC) of a system 405. In one embodiment, a virtual switch 315 is a software abstraction of an Ethernet switch in the hypervisor 316 for providing connectivity for VMs 320.

Figure 5:
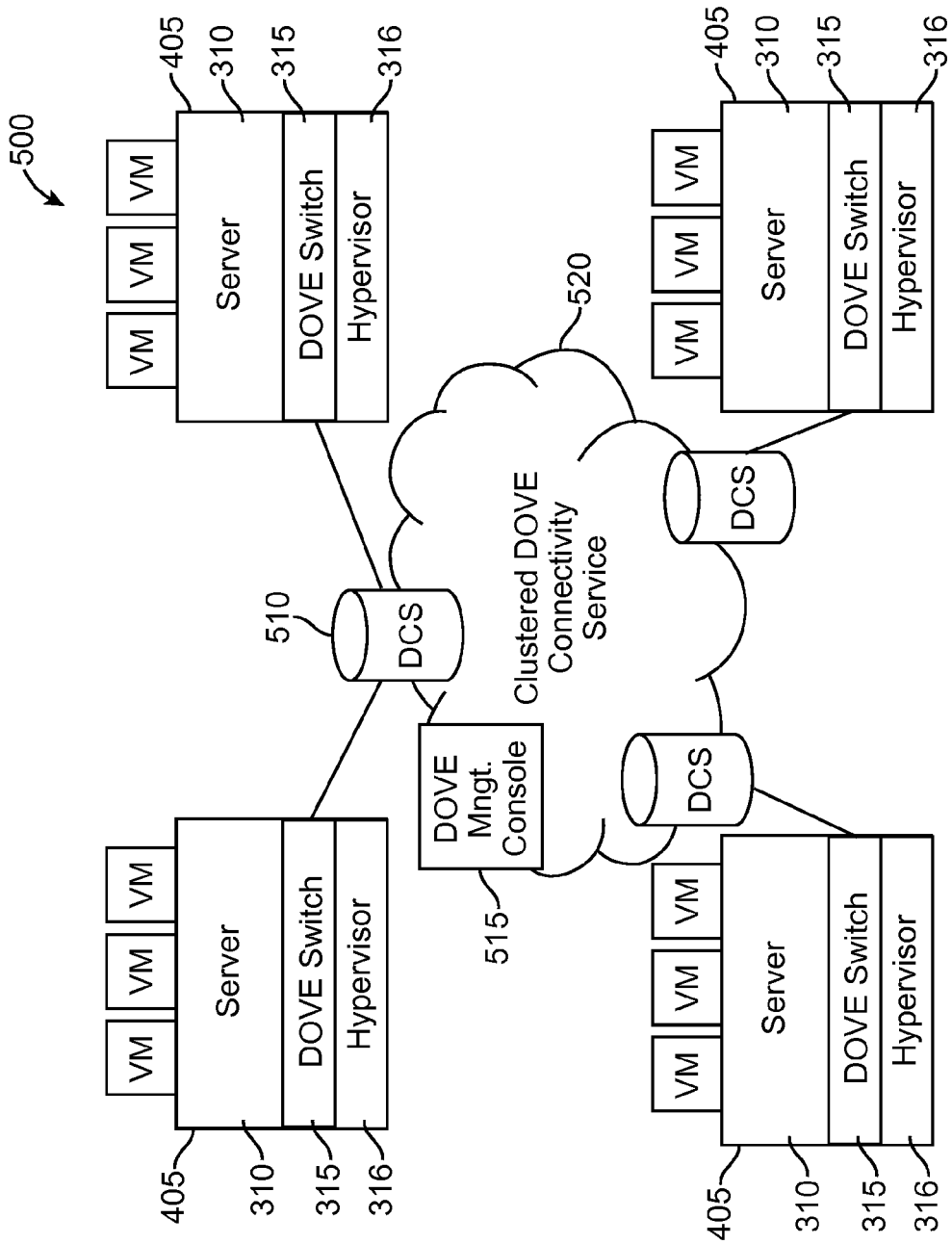
FIG. 5 illustrates another block diagram of a distributed overlay virtual environment, in accordance with an embodiment of the invention.

FIG. 5 illustrates a block diagram illustrating a distributed overlay virtual environment 500 for showing example for address discovery, in accordance with an embodiment of the invention. In one embodiment, the distributed overlay virtual environment 500 includes multiple systems 405, and a clustered DOVE connectivity service (DCS) 520. In one embodiment, the DCS 520 comprises multiple DCS nodes 510 and a DOVE management console 515 for managing the multiple DCS nodes 510 and providing the DCS node 510 an internet protocol (IP) address to a virtual switch 315. In one embodiment, on a VM 320 activation, a virtual switch 315 detects the IP/MAC address of the VM 320 and updates address mapping in the DCS 520. In one embodiment, the DCS nodes 510 share the address mapping information in the clustered DCS 520. In one example embodiment, a first VM 320 begins communicating with a second VM 320 in another system 405. The virtual switch 315 associated with the first VM 320 requests resolution from a DCS 510 servicing the virtual switch 315. The DCS 510 responds with the second VM 320 mapping information, which is cached locally at the virtual switch 315. In one embodiment, the mapping is tracked in a DCS node that is hosted by a server 310 and comprises mapping addresses of VMs 320 and their associated virtual switches 315.

Figure 6:
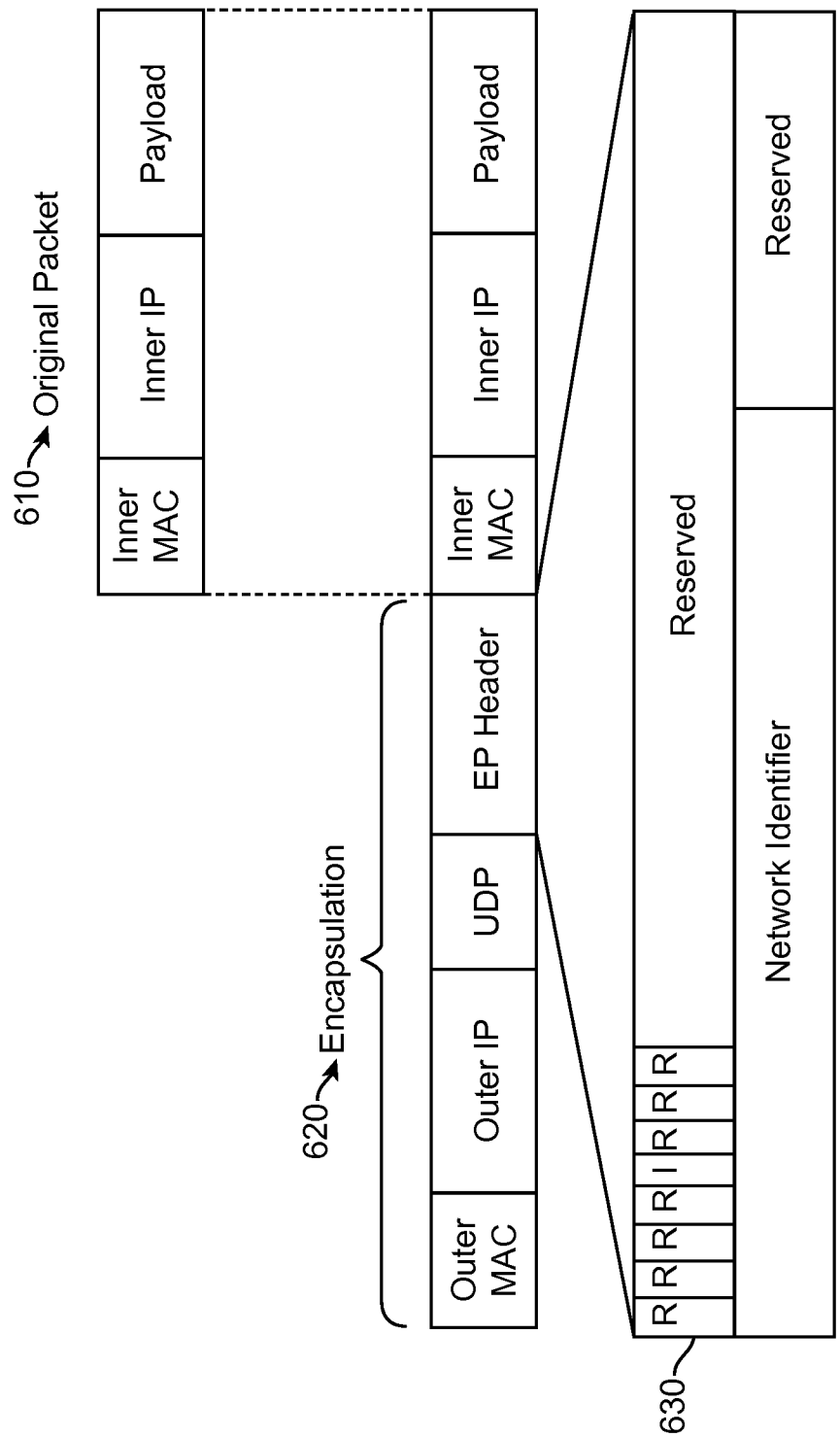
FIG. 6 illustrates an encapsulation format that may be used, in accordance with an embodiment of the invention.

FIG. 6 illustrates an example encapsulation format that may be used, in accordance with an embodiment of the invention. In one embodiment, an original packet 610 may comprise an inner MAC address, an inner IP address, and payload information. One VM 320 desires to communicate the original packet 610 from one VM 320 to another VM 320. In one embodiment, the original packet 610 is encapsulated by a system 405 by adding encapsulation formatted fields 620, such as for an outer MAC address, outer IP address, user datagram protocol (UDP), the encapsulation protocol header, and an optional field (not shown). In one embodiment, the encapsulation protocol header comprises a format 630 of a specific encapsulation protocol type, such as VxLAN, NVGRE, etc. In one embodiment, each virtual switch 315 supports specific tunneling translation encapsulation protocol formats. If an encapsulated packet is sent to a VM 320 associated with a virtual switch 315 that doesn't support the encapsulation protocol type for the encapsulated packet, the packet must be formatted or translated (e.g., by a translation gateway 910/920, FIG. 8) with an encapsulation protocol type that it can process.

In one embodiment, the virtual switch 315 interoperate with a DCS node 510 and exchanges information with the DCS node 510 using type-length value (TLV)/UDP based protocol. The DCS node 510 replicates information for forwarding requests and communicating a DCS node IP address to the virtual switch 315.

Figure 7:
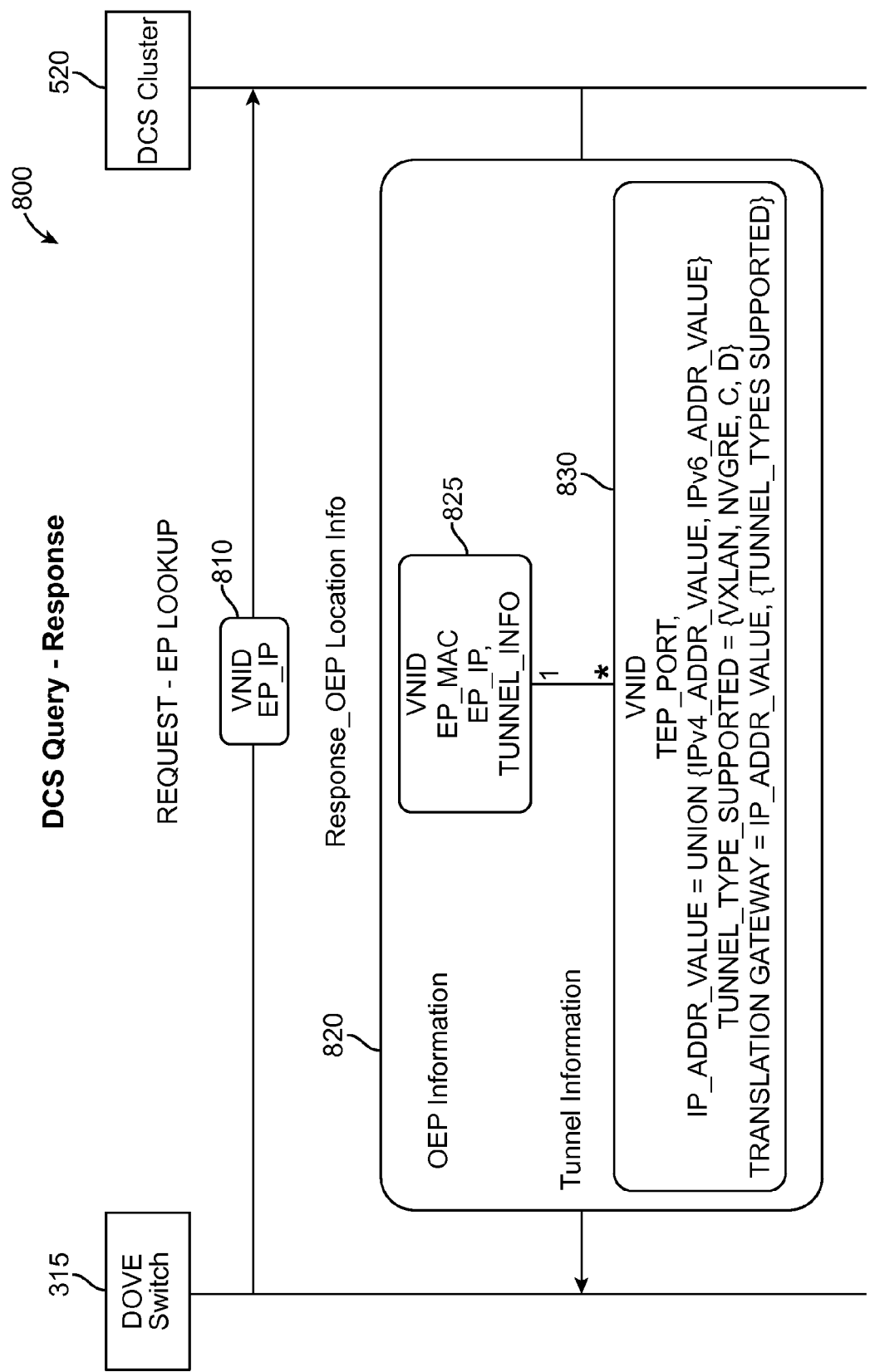
FIG. 7 is a block diagram showing an example distributed virtual Ethernet (DOVE) connectivity service (DCS) response, in accordance with an embodiment of the invention.

FIG. 7 is a block diagram showing an example DCS query—response 800, in accordance with an embodiment of the invention. In one embodiment, the virtual switch 315 forwards a request 810 for TUNNEL_INFO type lookup from the DCS cluster 520. In one embodiment, the request includes a request for the End Point IP address and the network identifier (e.g., virtual network ID) for communicating with a destination VM 320 and the DCS responds with the End Point MAC and TUNNEL_INFO. In one embodiment, the DCS node 510 enhances the TUNNEL_INFO mapping of address of VMs 320 and virtual switches 315 with the encapsulation/tunnel types (e.g., VxLAN, NVGRE, C, D, etc.) that are supported by each virtual switch 315. In one embodiment, the DCS node 510 further maintains a list of each translation gateway (e.g., translation gateway 910, translation gateway 920, etc., FIG. 9) and maps each gateway in the list with encapsulation protocol/tunnel type translation capabilities of each respective gateway.

In one embodiment, a DCS node 510 responds to the request 810 by providing the virtual switch 315 with information 820 comprising End Point information 825 and tunnel information 830. In one embodiment, the End Point information comprises VNID, End Point MAC address, End Point IP address, and the tunnel information 830 comprises VNID, Tunnel End Point (TEP also referred to as DOVE vSwitch) port, IP address value, tunnel type supported, translation gateway, and tunnel types supported. In this embodiment, in addition to the location information (e.g., End Point information 825), the type of encapsulation protocol/tunnel type supported (e.g., tunnel information 830) is also supplied to the source virtual switch 315.

In one embodiment, once a source virtual switch 315 for a first VM 320 obtains the address location information and the tunnel type supported by the virtual switch 315 for the destination VM 320, the source virtual switch 315 determines whether the destination virtual switch 315 (e.g., the tunneling endpoint) and itself can support a common tunnel type. In one embodiment, the source virtual switch 315 selects a common tunnel type supported by itself and the destination virtual switch 315 and encapsulates a packet with the common tunnel type supported by itself and the destination virtual switch 315 for the destination VM 320. In this embodiment, based on the selected tunnel type that is common to both virtual switches 315, no translation is required to occur via a translation gateway (e.g., translation gateway 910, translation gateway 920, etc., FIG. 8), which provides better efficiency due to less processing and communication latency.

In one embodiment, a DCS node 510 creates a list of supported tunnel types supported by each virtual switch 315 and assigns a priority for each supported tunnel type supported for each virtual switch 315. In one embodiment, the priority may be determined based on the number of virtual switches 315 that support a particular tunnel type, a system administrator preference, efficiency of processing particular tunnel types, etc. In one embodiment, the list of supported tunnel types for each virtual switch 315 is sorted in priority order, and the source virtual switch 315 selects the common tunnel type supported by the source virtual switch 315 and the destination virtual switch 315 based on highest priority.

In one embodiment, if the source virtual switch 315 determines that no common tunnel type exists for itself and the destination virtual switch 315, the source virtual switch 315 uses the list of available translation gateways for selecting a nearest translation gateway to use that supports at least one tunnel type format that is supported by the source virtual switch 315 and at least another tunnel type supported by the destination virtual switch 315. In this embodiment, the nearest translation gateway that implements a common denominator of tunnel types supported by the source virtual switch 315 and the destination virtual switch 315 is used as a destination tunneling endpoint for reducing lookup processing and latency.

Figure 8:
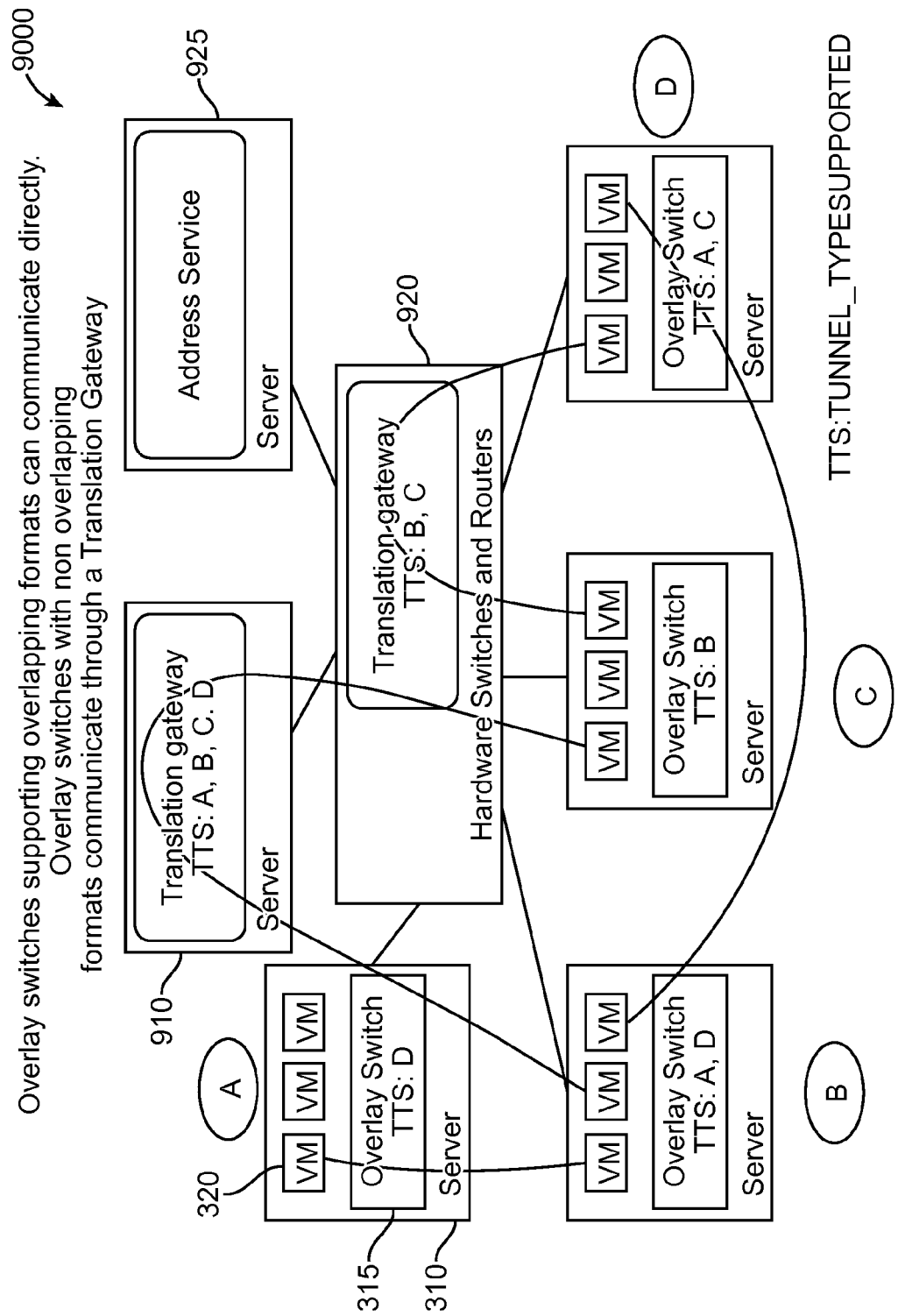
FIG. 8 is a block diagram showing example communications with translation gateways, in accordance with an embodiment of the invention.

FIG. 8 is a block diagram showing example communication 900 with translation gateways 910 and 920, in accordance with an embodiment of the invention. In one embodiment, to communicate between a first VM 320 from system A and a second VM 320 from system B, since the virtual switch 315 from system A supports tunnel type D, and after the source virtual switch 315 determines that the destination virtual switch 315 supports tunnel type D (based on a response to a request to the address service 925 including a DCS), the source switch 315 encapsulates a packet using the tunnel type D and sends the packet for its associated VM 320 to the destination virtual switch 315 without having to first send the packet to a translation gateway (e.g., translation gateway 910 or 920). In the example communication 900, communication from system B to system D is direct as both virtual switches 315 support tunnel type A (e.g., a common tunnel type).

In one example embodiment, when a VM 320 on system B communicates with a VM 320 on system C, the source virtual switch 315 receives the tunnel type information of the destination virtual switch 315 (for the destination VM 320) in a response from the address service 925 to a location request. In one example, it is determined that the two virtual switches 315 do not support a common tunnel type (e.g., the virtual switch 315 of system B supports tunnel type A and D, and the virtual switch 315 of system C supports tunnel type B). In one example, the virtual switch 315 from system A queries the DCS from the address service 925 to obtain a list of translation gateways that support at least one format supported by the virtual switch 315 from system B and at least one format supported by the virtual switch 315 from system C. From the obtained list of translation gateways, the virtual switch 315 from system A determines that the closest (and in this example, only) translation gateway that supports formats A and D (for the virtual switch 315 from system B) and format B (from the virtual switch 315 from system C) is the translation gateway 910. In one embodiment, from the obtained list, the virtual switch 315 from system B encapsulates the data packet using the tunnel type that it has in common with the translation gateway 910 (e.g., tunnel type A or D) and sends the encapsulated packet to the translation gateway 910. The translation gateway 910 removes the existing encapsulation header and applies a new header that is compatible with the virtual switch 315 of system C for the destination VM 320, in this case, using tunnel type B.

In another example embodiment, when a VM 320 on system C communicates with a VM 320 on system D, the source virtual switch 315 receives the tunnel type information of the destination virtual switch 315 (for the destination VM 320). In one example, it is determined that the two virtual switches 315 do not support a common tunnel type (e.g., the virtual switch 315 of system C supports tunnel type B, and the virtual switch 315 of system D supports tunnel types A and C). In one example, the virtual switch 315 from system C queries the DCS from the address service 925 to obtain a list of translation gateways that support at least one format supported by the virtual switch 315 from system C and at least one format supported by the virtual switch 315 from system D. From the obtained list of translation gateways, the virtual switch 315 from system A determines that both translation gateway 910 and translation gateway 920 support tunnel type B. However, the closest translation gateway that supports tunnel format B is the translation gateway 920. In one embodiment, from the obtained list, the virtual switch 315 from system C encapsulates the data packet using the tunnel type that it has in common with the translation gateway 920 (e.g., tunnel type B) and sends the encapsulated packet to the translation gateway 920. The translation gateway 920 removes the existing encapsulation header and applies a new header that is compatible with the virtual switch 315 of system D for the destination VM 320, in this case, using tunnel type C.

Figure 9:
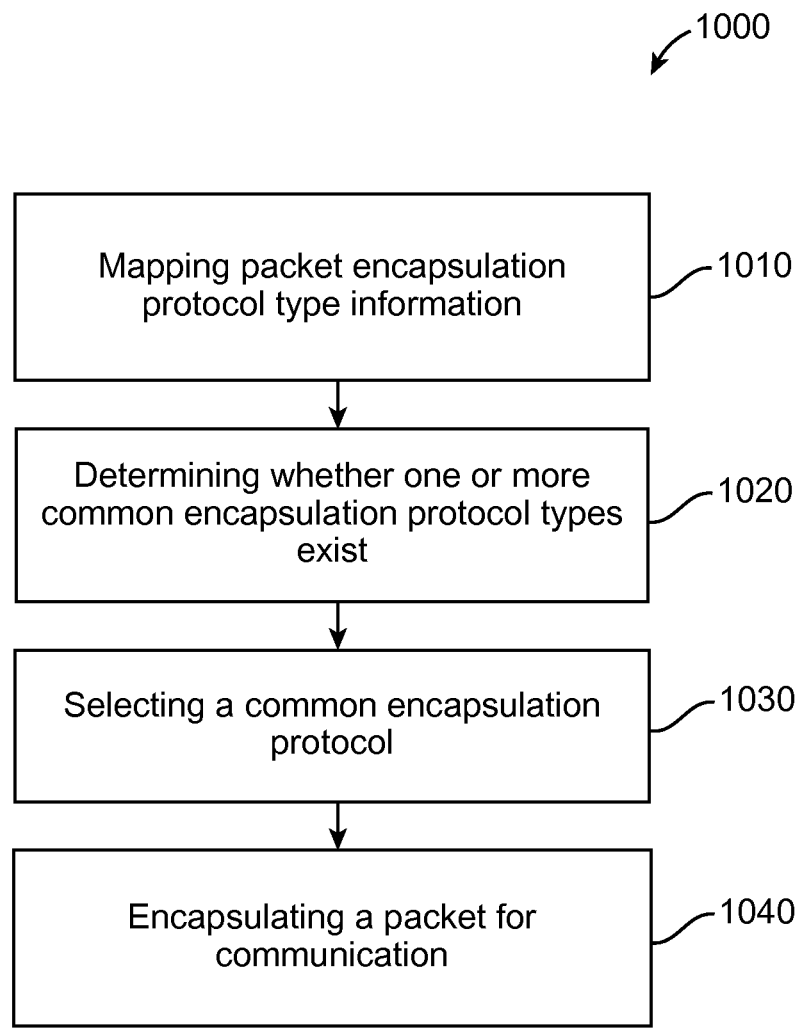
FIG. 9 is a block diagram showing an example process for providing interoperability between hosts supporting multiple encapsulation networks, in accordance with an embodiment of the invention.

FIG. 9 illustrates a block diagram for the example process 1000 providing interoperability between hosts supporting multiple encapsulation networks, according to one embodiment. In one embodiment, process block 1010 provides mapping packet encapsulation protocol type information for a plurality of virtual switches (e.g., virtual switches 315), wherein each virtual switch is associated with one or more VMs (e.g., a VM 320). In one embodiment, process block 1020 provides determining whether one or more common encapsulation protocol types exist for a first VM associated with a first virtual switch and a second VM associated with a second virtual switch based on the mapping. In one embodiment, process block 1030 provides selecting a common encapsulation protocol type if it is determined that one or more common encapsulation protocol types exist for the first virtual switch and the second virtual switch. In one embodiment, process block 1040 provides encapsulating a packet for communication between the first VM and the second VM using the selected common encapsulation protocol type.

In one embodiment, process 1000 further provides creating a list of available translation gateways, wherein the list comprises translation capability for each translation gateway. Upon determining that a common encapsulation protocol type for the first virtual switch and the second virtual switch does not exist, the list of available translation gateways is used for selecting a translation gateway to use that supports at least one encapsulation format supported by the first virtual switch and at least another encapsulation format supported by the second virtual switch. In one embodiment, the process 1000 further comprises providing encapsulation capabilities of a tunneling endpoint on which the first virtual switch resides to a server including a DCS, and upon determining that a common encapsulation protocol type for the first virtual switch and the second virtual switch does not exist, information is provided for a nearest translation gateway that implements a common denominator of encapsulation protocol types supported by the first virtual switch and the second virtual switch for use as a destination tunneling endpoint.

The systems 400 and 500 may include one or more source programs, executable programs (object code), scripts, or any other entity comprising a set of computer program instructions to be performed. When the systems 400 and 500 include a source program, then the program is usually translated via a compiler, assembler, interpreter, or the like, which may or may not be included within a storage device. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can store the program for use by or in connection with the instruction execution system, apparatus, or device. The computer readable medium is an electronic, magnetic, optical, or semiconductor system, apparatus, device, or other physical device or means that can store a computer program for use by or in connection with a computer related system or method.

More specific examples (a non-exhaustive list) of the computer-readable medium would include the following: a portable computer diskette (magnetic or optical), a random access memory (RAM) (electronic), a read-only memory (ROM) (electronic), an erasable programmable read-only memory (EPROM, EEPROM, or Flash memory) (electronic), and a portable compact disc memory (CDROM, CD R/W) (optical).

Program code embodied on a computer readable medium may be transmitted using any appropriate medium, including but not limited to wireless, wireline, optical fiber cable, RF, etc., or any suitable combination of the foregoing.

In one embodiment, where the systems 400 and 500 are implemented in hardware, the systems 400 and 500 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Aspects of the present invention are described below with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method comprising:
    mapping packet encapsulation protocol type information for a plurality of virtual switches, wherein each virtual switch being associated with one or more virtual machines (VMs);
    determining whether one or more common encapsulation protocol types exist for a first VM associated with a first virtual switch and a second VM associated with a second virtual switch based on the mapping;
    selecting a common encapsulation protocol type if it is determined that one or more common encapsulation protocol types exist for the first virtual switch and the second virtual switch; and
    encapsulating a packet for communication between the first VM and the second VM using the selected common encapsulation protocol type.

2. The method of claim 1, further comprising:
    creating a list of supported encapsulation protocol types for each virtual switch;
    assigning a priority for each supported encapsulation protocol type for each virtual switch; and
    sorting the list of supported encapsulation protocol types for each virtual switch in priority order.

3. The method of claim 2, wherein selecting the common encapsulation protocol type comprises selecting an encapsulation protocol type having a highest priority from the list of supported encapsulation protocol types.

4. The method of claim 1, further comprising:
    creating a list of available translation gateways, wherein the list comprises translation capability for each translation gateway.

5. The method of claim 2, wherein upon determining that a common encapsulation protocol type for the first virtual switch and the second virtual switch does not exist, using the list of available translation gateways for selecting a translation gateway to use that supports at least one encapsulation format supported by the first virtual switch and at least another encapsulation format supported by the second virtual switch.

6. The method of claim 1, further comprising:
    providing encapsulation capabilities of a tunneling endpoint on which the first virtual switch resides to a server including a distributed overlay virtual Ethernet (DOVE) connectivity service (DCS).

7. The method of claim 6, wherein upon determining that a common encapsulation protocol type for the first virtual switch and the second virtual switch does not exist, providing information for a nearest translation gateway that implements a common denominator of encapsulation protocol types supported by the first virtual switch and the second virtual switch for use as a destination tunneling endpoint.

8. A system comprising:
    a hardware layer comprising physical devices;
    a plurality of virtual switches each associated with one or more virtual machines (VMs) overlaying the hardware layer; and
    a server including a distributed overlay virtual Ethernet (DOVE) connectivity service (DCS) that maps packet encapsulation protocol type information for the plurality of virtual switches and determines whether one or more common encapsulation protocol types exist for a first VM associated with a first virtual switch and a second VM associated with a second virtual switch based on the packet encapsulation protocol map, selects a common encapsulation protocol type if one or more common encapsulation protocol types exist for the first virtual switch and the second virtual switch,
    wherein the first virtual switch encapsulates a packet for communication between the first VM and the second VM using the selected common encapsulation protocol type.

9. The system of claim 8, wherein the server including the DCS creates a list of supported encapsulation protocol types for each virtual switch of the plurality of virtual switches, assigns a priority for each supported encapsulation protocol type for each of the virtual switches, and sorts the list of supported encapsulation protocol types for each virtual switch in priority order.

10. The system of claim 9, wherein the server including the DCS selects the common encapsulation protocol type having a highest priority from the list of supported encapsulation protocol types.

11. The system of claim 8, wherein the server including the DCS creates a list of available translation gateways, wherein the list comprises translation capability for each translation gateway.

12. The system of claim 9, wherein the server including the DCS selects a translation gateway to use by the first virtual switch and the second virtual switch, wherein the selected translation gateway supports at least one encapsulation format supported by the first virtual switch and at least another encapsulation format supported by the second virtual switch.

13. The system of claim 8, wherein the first virtual switch provides encapsulation capabilities of a tunneling endpoint, on which the first virtual switch resides, to the server including the DCS.

14. The system of claim 13, wherein the server including the DCS provides information for a nearest translation gateway that implements a common denominator of encapsulation protocol types supported by the first virtual switch and the second virtual switch for use as a destination tunneling endpoint.

15. A computer program product for providing interoperability between hosts supporting multiple encapsulation, the computer program product comprising a computer readable storage device having program code embodied therewith, the program code readable/executable by a processor to perform a method comprising:
  mapping, by the processor, packet encapsulation protocol type information for a plurality of virtual switches, wherein each virtual switch being associated with one or more virtual machines (VMs);
  determining, by the processor, whether one or more common encapsulation protocol types exist for a first VM associated with a first virtual switch and a second VM associated with a second virtual switch based on the mapping;
  selecting a common encapsulation protocol type, by the processor, if it is determined that one or more common encapsulation protocol types exist for the first virtual switch and the second virtual switch; and
  encapsulating a packet, by the processor, for communication between the first VM and the second VM using the selected common encapsulation protocol type.

16. The computer program product of claim 15, further comprising:
  creating a list of supported encapsulation protocol types, by the processor, for each virtual switch;
  assigning a priority for each supported encapsulation protocol type, by the processor, for each virtual switch; and
  sorting the list of supported encapsulation protocol types, by the processor, for each virtual switch in priority order.

17. The computer program product of claim 16, wherein selecting the common encapsulation protocol type comprises selecting an encapsulation protocol type having a highest priority from the list of supported encapsulation protocol types.

18. The computer program product of claim 15, further comprising:
  creating, by the processor, a list of available translation gateways, wherein the list comprises translation capability for each translation gateway.

19. The computer program product of claim 16, wherein upon determining that a common encapsulation protocol type for the first virtual switch and the second virtual switch does not exist, using the list of available translation gateways for selecting a translation gateway to use that supports at least one encapsulation format supported by the first virtual switch and at least another encapsulation format supported by the second virtual switch.

20. The computer program product of claim 15, further comprising:
  providing, by the processor, encapsulation capabilities of a tunneling endpoint on which the first virtual switch resides to a server including a distributed overlay virtual Ethernet (DOVE) connectivity service (DCS), wherein, upon determining that a common encapsulation protocol type for the first virtual switch and the second virtual switch does not exist, providing information for a nearest translation gateway that implements a common denominator of encapsulation protocol types supported by the first virtual switch and the second virtual switch for use as a destination tunneling endpoint.

* * * * *